UNITED STATES PATENT OFFICE.

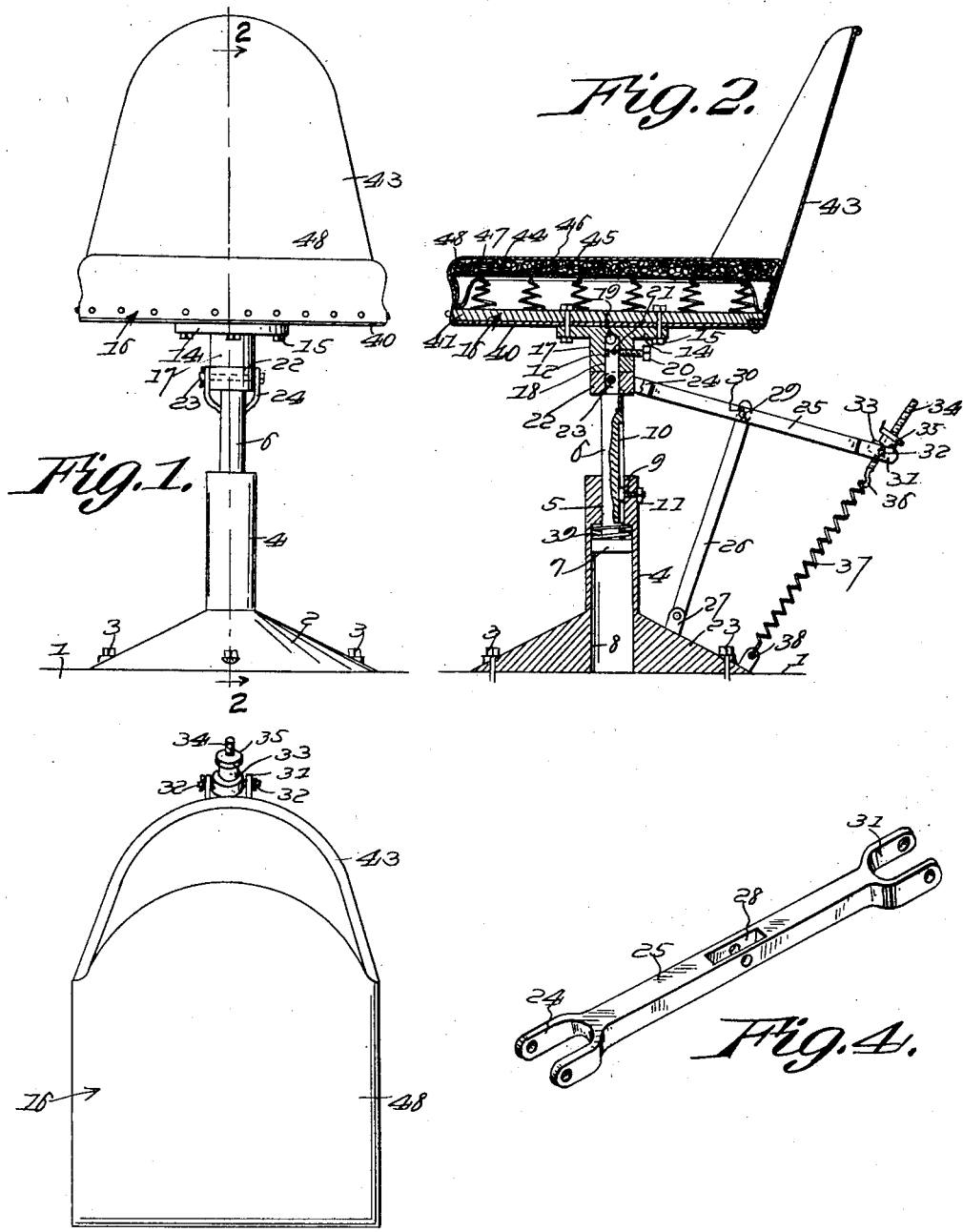

BYRON B. BRITTELL, OF WILLOW SPRINGS, MISSOURI.

SEAT FOR ENGINEERS IN LOCOMOTIVE CABS.

1,403,483.  Specification of Letters Patent.  Patented Jan. 17, 1922.

Application filed March 19, 1921. Serial No. 453,619.

*To all whom it may concern:*

Be it known that I, BYRON B. BRITTELL, a citizen of the United States, residing at Willow Springs, in the county of Howell and State of Missouri, have invented certain new and useful Improvements in Seats for Engineers in Locomotive Cabs, of which the following is a specification, reference being had to the accompanying drawings.

It has been found that the jolts and vibration coincident to fast travel of locomotives is very trying on the engineers, as they are very much worn out at the end of a long run.

Therefore it is the purpose of the present invention to provide an improved seat or chair particularly adapted for location in the engineer's cab, for taking up the jolt and vibration, thereby permitting the engineer to ride with ease and comfort.

Another purpose is the provision of a seat or chair, which will not only take up the jolt and vibrations, but may also be allowed to revolve, allowing the occupant to turn in different directions as may be desired.

A still further purpose is to provide a device of this character which is simple, efficient and practical in construction, may be manufactured for a relatively low cost and sold and equipped on cabs of locomotives at a reasonable profit.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in front elevation of the improved seat or chair constructed in accordance with the invention.

Figure 2 is a sectional view on line 2—2 of Figure 1, showing the construction of the stand on which the seat proper is mounted.

Figure 3 is a plan view.

Figure 4 is a detail perspective view.

Referring to the drawings, 1 designates the floor of any moving vehicle, preferable the floor of the cab of a locomotive, and 2 denotes the base of the stand, which is fastened to the floor by means of suitable bolts or the like 3. The base 2 has an upwardly protruding extension 4 provided with a cylindrical bore or socket 5 for the reception of the spindle 6. The lower end of the spindle 6 has a head or shoulder 7, to limit the upward movement of the spindle. The spindle may be inserted through the bore or socket 5, before the base 2 is fastened to the floor, as the lower portion of the base has an opening 8 through which the spindle may pass. A dowel pin 9 is threaded through the wall of the bore or socket with its head located on the interior of the bore or socket, so as to engage the key way 10 formed in the spindle, thereby preventing rotation of the spindle. A nut 11 is threaded on the outer end of the dowel pin, to hold the pin in position.

The upper end of the spindle has a reduced extension 12 and an adjoining shoulder 13. A circular plate 14 is bolted at 15 to the under face of the seat proper 16. This plate 14 has a downwardly protruding extension 17 provided with a socket 18, which receives the reduced extension 12 of the spindle, the shoulder 13 acting to limit the extension in the socket. The upper end of the reduced extension has a thrust ball bearing 19 with the bottom of the socket 18, thereby permitting the seat proper to easily revolve, provided the occupant so desires. However to hold the seat against revolving a suitable set screw 20 engages through the wall of the extension 17 and bears in any one of the slight depressions 21 formed on the reduced extension 12. To secure the seat proper against rotation, a wrench may be used to tighten up the set screw. A collar 22 is mounted on the upper end of the spindle against the shoulder 13, with a pin 23 passing through the collar and the spindle. The end of this pin 23 projects outwardly beyond the surface of the collar and constitutes journals, on which the forks 24 of the lever 25 are fulcrumed. A lever 26 is pivotally mounted at 27 on the base 2 of the stand, and its upper end is pivotally mounted in the slot 28 of the lever 25 by means of a pin 29, there being a cotter pin 30 passing through the end of the pin 29 to prevent displacement thereof. The rear end of the lever 25 terminates in forks 31, in bearings of which the journals 32 of the collar 33 are mounted. A threaded rod 34 passes through the collar 33 and has a thumb nut 35 mounted thereon. The lower end of the threaded rod 34 terminates in a hook 36, to which one end of a coiled spring 37 is connected. The other end of the coiled spring 37 is connected at 38 to the base 2 of the stand. Obviously by turning up the thumb nut 35, the tension of the coiled spring 37 may increase, and by reverse movement the tension may be decreased.

A coiled spring 39 is interposed between the head or shoulder 7 and the lower end of the wall of the bore 5, so as to take up the rebound of the spindle. It will be noted that the spring 37 holds the head or shoulder 7 in contact with the recoil or rebound spring 39. Also it will be observed that the seat and its occupant will vibrate coincident to the vibration of the locomotive, for the reason that when the seat moves downwardly, the coiled spring 37 will stretch, and when the seat and its occupant moves upwardly, the head or shoulder 7 will contact with the recoil or rebound spring, and cushion the seat in its upward movement.

The seat proper comprises a sheet metal plate 40, on which a wooden base 41 is secured by means of screws. The seat proper may be any suitable shape, preferably as shown in Figure 3, and fastened between the sheet metal plate 40 and the wood base 41 is the flange 42 of the sheet metal back 43, which inclines upwardly and rearwardly. The back is arcuate in cross section, and has an upper arcuate edge as shown.

The seat includes a cushion, comprising a plurality of coiled springs 44 of tapered helical form, and these springs are tied together in the usual manner by heavy cord, so that they will remain in place. The lower ends of the springs are fastened in any suitable manner to the base 41. A piece of burlap or any other suitable material 45 is stretched over the tops of the springs, and is tacked or otherwise fastened to the edge of the wood base 41. A piece of gauze 46 is likewise stretched over the burlap and is likewise fastened to the wood base 41. Over the gauze hair or other suitable material 47 is placed, and then stretched over the hair is an outer covering 48 of leather or a good grade of imitation thereof, and is fastened to the edge of the base 41.

This cushion or the seat proper is of the usual or general construction employed in connection with household furniture.

Obviously the engineer may have ease and comfort when riding in the cab of the locomotive, and may at any time adjust the seat so as to rotate, or turn to any position that may be desired. In riding, the seat will readily take up all the jolts and vibrations, coincident to the travel of the locomotive.

The invention having been set forth, what is claimed as being useful is:

1. In a device for the purpose indicated, a base, a spindle having a sliding socket connection with the base, a seat mounted on the upper end of the spindle, a lever fulcrumed on the base, a second lever fulcrumed to the upper end of the first lever and having one end pivotally and operatively connected to the spindle, and a coiled spring cooperatively connecting the base and the other end of the second lever.

2. In a device for the purpose indicated, a base, a spindle having a sliding socket connection with the base, a seat mounted on the upper end of the spindle, a lever fulcrumed on the base, a second lever fulcrumed to the upper end of the first lever and having one end pivotally and operatively connected to the spindle, and a coiled spring cooperatively connecting the base and the other end of the second lever, and means for taking up the rebound and limiting the spindle in its upward movement.

3. In a device for the purpose indicated, a base, a spindle having a sliding socket connection with the base, means to prevent rotation of the spindle, a seat mounted to rotate on the upper end of the spindle, a lever fulcrumed to the base, a second lever fulcrumed to the first lever at a point substantially midway its ends, one end of the second lever being operatively connected to the spindle, tensioning means connecting the base and the other end of the second lever.

4. In a device for the purpose indicated, a base, a spindle having a sliding socket connection with the base, means to prevent rotation of the spindle, a seat mounted to rotate on the upper end of the spindle, a lever fulcrumed to the base, a second lever fulcrumed to the first lever at a point substantially midway its ends, one end of the second lever being operatively connected to the spindle, tensioning means connecting the base and the other end of the second lever, means for holding the seat against rotation on the spindle, and means for taking up the rebound and limiting the spindle in its upward movement.

In testimony whereof I hereunto affix my signature.

BYRON B. BRITTELL.